L. A. YOUNG.
RIM STRIP.
APPLICATION FILED AUG. 31, 1916.
1,226,737.
Patented May 22, 1917.
3 SHEETS—SHEET 1.
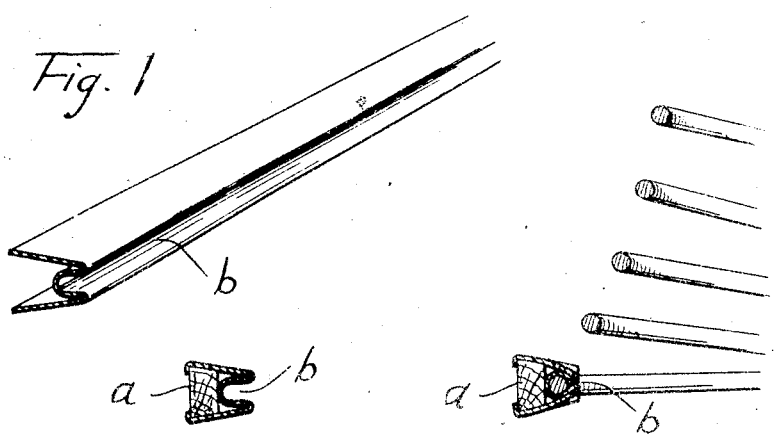
Fig. 1
Fig. 2
Fig. 3
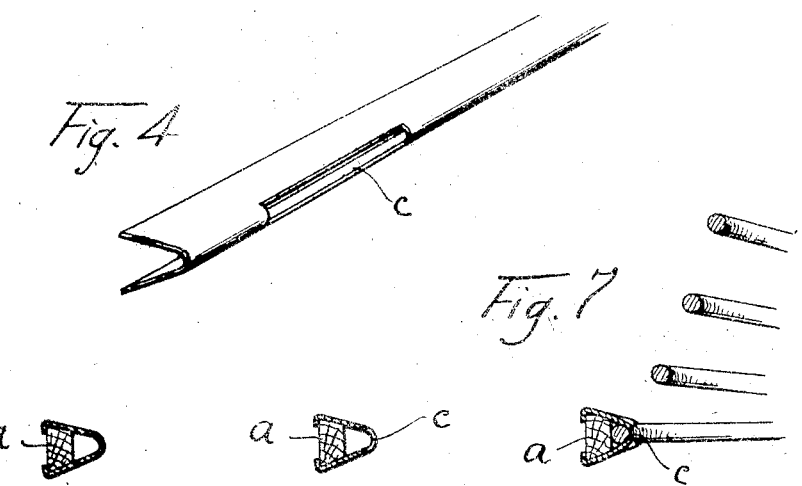
Fig. 4
Fig. 5
Fig. 6
Fig. 7
INVENTOR
Leonard A. Young
BY Raymond A. Parker
ATTORNEY

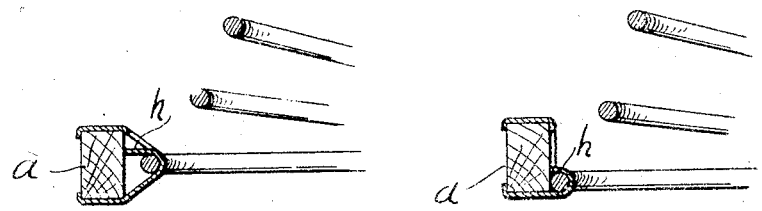
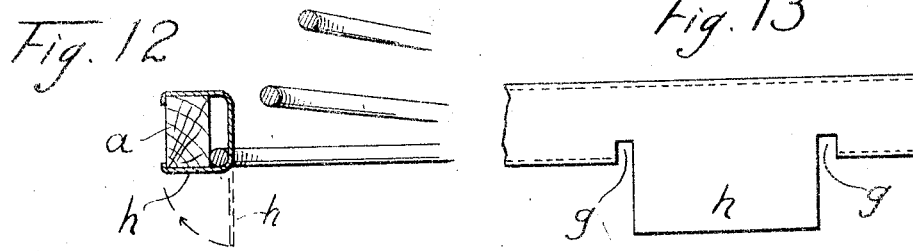
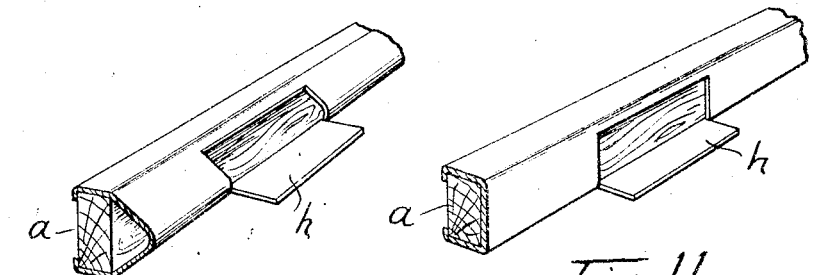

UNITED STATES PATENT OFFICE.

LEONARD A. YOUNG, OF HIGHLAND PARK, MICHIGAN.

RIM-STRIP.

1,226,737.　　　　Specification of Letters Patent.　　Patented May 22, 1917.

Application filed August 31, 1916.　Serial No. 117,948.

*To all whom it may concern:*

Be it known that I, LEONARD A. YOUNG, a citizen of the United States, residing at Highland Park, county of Wayne, State of Michigan, have invented a certain new and useful Improvement in Rim-Strips, and declare the following to be a full, clear, and exact description of the same, such as will enable others skilled in the art to which it pertains to make and use the same, reference being had to the accompanying drawings, which form a part of this specification.

This invention relates to rim strips for spring seats and has for its object a rim strip arranged to both carry a tacking strip and for securing the coil springs in place.

The genus hereinafter shown is a rim strip of the channel type provided at its back with an opening or recess arranged to receive one of the convolutions of the coiled spring which is secured in such opening or recess. The various species are clearly portrayed in the drawings accompanying this specification.

Figure 1, is a perspective of one form of the rim strip, similar to a W in cross-section.

Fig. 2, is a cross-section of the same, the view being taken before the spring is inserted.

Fig. 3, is a cross-section of the same, showing one of the coils of the spring pinched into the rim strip.

Fig. 4, is a perspective of a modified form, of the V-type.

Fig. 5, is a cross-section of the same.

Fig. 6, is a cross-section of the same taken through a slotted portion.

Fig. 7, is a cross-section of the same, showing one of the coils of the coiled spring pinched in.

Fig. 8, is a cross-section showing the strip of the V-type having a lip pinched over the coiled spring.

Fig. 9, is a sectional perspective showing the same strip before being pinched over the coil of the spring.

Fig. 10, and Fig. 11, show a strip of rectangular cross-section involving the same idea.

Figs. 12 and 13 show a still further modified form.

Figure 14:
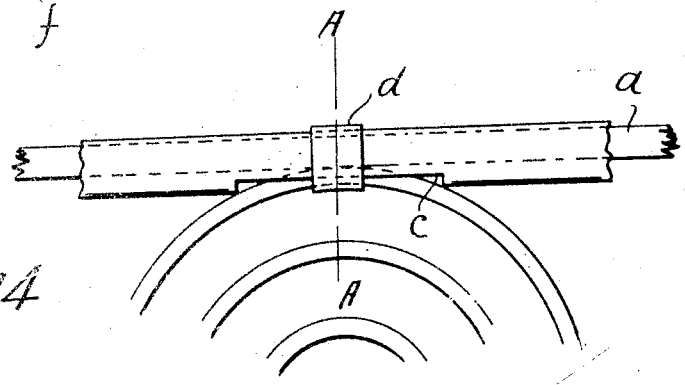

Fig. 14, is a plan view of the same V form of strip but showing the use of a clip to hold the coiled spring in place.

Figure 15:
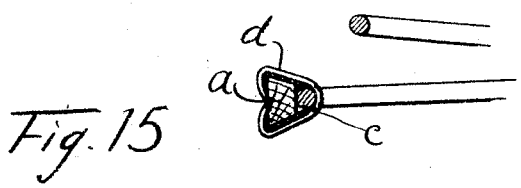

Fig. 15, is a cross-section of this V strip showing the clip.

Figure 16:
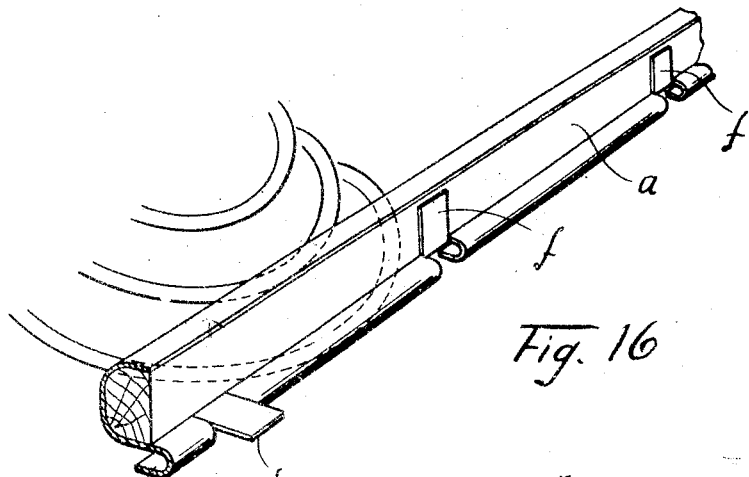

Fig. 16, shows a perspective of an S strip.

A rim strip which both holds the coiled spring and carries a tacking strip is old in the art. Among the more recent devices an S form of strip has been used but these S strips require more metal and are harder to bend around the corners than the type of strip that I have shown in the drawings which, broadly considered, is a simple channel provided with an opening in the rear. In Figs. 1, 2, and 3 this opening is lettered *b* and comprises a supplemental or inwardly facing channel pressed in the back of the channel strip. It will readily be seen that the large channel can be turned over the tacking strip *a* and the walls of the small channel can be pressed down over the lower coil of the spring as shown in Fig. 3.

Another form of the invention is shown in Figs. 4 to 7 inclusive. This is V-shaped in cross-section and has a slot *c* cut in the apex of the V or in the back of the channel. The lower coil of the spring may be inserted in this and the stock pinched thereover, as shown in Fig. 7.

Figs. 14 and 15 show substantially the same type of rim strip but a band-like clip *d* is employed for holding the coil of the spring within the slot or recess of the rim. In Fig. 16 an S type of strip is employed which is novel in the use of the spurs *f* which are turned up out of the lower channel *e* of the S for securing the tacking strip *a* in place and doing away with the necessity of tacking the tacking strip in, as shown in the prior art.

In the form of strip shown in Figs. 8 to 11 the opening at the back of the strip is formed without striking the stock completely out but merely turning it back, as shown in Figs. 9 and 11, then turning the lip or flap *h* back over the coil of the spring, as shown in Figs. 8 and 10.

In Figs. 12 and 13, the opening at the back of the channel strip is a plural one, that is to say, there is an opening for each side of the coil to pass in and out of the channel strip with the intervening stock left in place. The stock is cut out at *g*, *g*, and the bottom of the strip or flap *h* turned down, as shown in Fig. 13. The coil may be inserted over the flap *h* and through the openings *g*, *g* and the flap turned back into the plane of the bottom of the channel thereby holding the coil, as shown in Fig. 12.

The above description makes it evident that a rim strip having the dual function of carrying the coil of the spring and the tacking strip for securing the upholstering is provided and that the same may be made out of a minimum amount of stock. It is simple and will be found easy to bend around the corners when desired.

What I claim is:

1. A rim strip, comprising an outwardly-opening channel having also an opening in the rear wall giving access to the space between the side walls of the channel, the front of the channel being arranged to carry a tacking strip and the opening at the rear being arranged to give access to and allow the support of a coiled spring.

2. A rim strip, having in combination a channel facing outwardly and an opening in the rear wall giving access to the space between the side walls of the channel, said opening being provided with adjacent stock which may be pinched over a coil of wire.

3. A rim strip, having in combination a channel strip provided with a slot cut in the rear through which a coil of wire may enter, the stock adjacent the slot being arranged to be pinched over the coil, and the front part of the channel being arranged to secure the upholstery.

4. A rim strip, having in combination a channel strip provided with a slot cut in the rear through which a coil of wire may enter, the stock adjacent the slot being arranged to be pinched over the coil, and the front of the channel being arranged to carry a tacking strip.

In testimony whereof I sign this specification.

LEONARD A. YOUNG.